US008147109B2

(12) United States Patent
Wan et al.

(10) Patent No.: US 8,147,109 B2
(45) Date of Patent: Apr. 3, 2012

(54) HEAT DISSIPATION DEVICE OF VEHICLE LAMP AND INTERPOSING ELEMENT THEREOF

(75) Inventors: Cheng-Feng Wan, Tainan (TW); Hao-Hui Lin, Tainan (TW); Su-Chen Hu, Tainan (TW); Chen-Jung Chen, Tainan (TW); Hui-Fen Huang, Tainan (TW)

(73) Assignee: Man Zai Industrial Co., Ltd., Tainan (TW)

( * ) Notice: Subject to any disclaimer, the term of this patent is extended or adjusted under 35 U.S.C. 154(b) by 310 days.

(21) Appl. No.: 12/623,662

(22) Filed: Nov. 23, 2009

(65) Prior Publication Data

US 2010/0315830 A1 Dec. 16, 2010

(30) Foreign Application Priority Data

Jun. 10, 2009 (TW) ............................... 98119337 A
Sep. 15, 2009 (TW) ............................... 98131057 A

(51) Int. Cl.
*B60Q 1/00* (2006.01)

(52) U.S. Cl. ........ 362/547; 362/294; 362/373; 362/507; 362/545

(58) Field of Classification Search .................. 362/294, 362/373, 487, 507, 543–547, 800
See application file for complete search history.

(56) References Cited

U.S. PATENT DOCUMENTS 7,329,033 B2 * 2/2008 Glovatsky et al. ............ 362/547

FOREIGN PATENT DOCUMENTS

| | | |
|---|---|---|
| TW | I252898 | 4/2006 |
| TW | M309521 | 4/2007 |
| TW | I299310 | 8/2008 |

OTHER PUBLICATIONS

Office action with a search report issued on Dec. 23, 2011 by TIPO for the counterpart TW Patent Application No. 098131057 of the captioned application.

* cited by examiner

*Primary Examiner* — Jason Moon Han
(74) *Attorney, Agent, or Firm* — WPAT, P.C.; Anthony King

(57) ABSTRACT

A heat dissipation device of a vehicle lamp and an interposing element thereof are provided. The heat dissipation device is installed in a lamp room which is divided by the interposing element into a front partition and a rear partition. A heat sink is installed in the interposing elements. An air feeding fan is disposed in an air feeding channel of the interposing element, for drawing air in the front partition to the rear partition through the air feeding channel. Further, a back flow fan is disposed in the rear partition, for drawing air in the rear partition to the front partition through a back flow channel. Whereby, the air in the front partition is cooled down through an external air flow passing through the lamp cover. Then, the heat sink dissipates heat of the air flow with the relatively low temperature in the front partition to the rear partition.

34 Claims, 11 Drawing Sheets

HEAT DISSIPATION DEVICE OF VEHICLE LAMP AND INTERPOSING ELEMENT THEREOF

BACKGROUND OF THE INVENTION

1. Field of the Invention

The present invention relates to a vehicle lamp, and more particularly to a heat dissipation device applied to a light emitting diode LED vehicle lamp and capable of providing an excellent heat dissipation function.

2. Description of the Related Art

With such advantages as low power consumption, long service life, and other excellent functions, LEDs are now widely applied in various light emitting devices to serve as light source. In existing vehicle lamp designs, high-power LEDs have increasingly replaced conventional bulbs as the light source.

In the conventional LED vehicle lamp, a combination of several high-power LEDs is used as a light emitting assembly in order to provide sufficient brightness. During operation, the high-power LEDs generate high heat. The light emitting assembly is installed in a vehicle lamp housing which is disposed on a front end of the vehicle and has a rear end abutting an engine room. A transparent cover is installed on a front end of the lamp housing for sealing the vehicle lamp. However, the conventional LED vehicle lamp structure lacks a suitable heat dissipation mechanism, so the high heat generated during the operation of the high-power LED assembly in the vehicle lamp cannot be lowered efficiently. Therefore, the high-power LEDs tend to be over-heated and have poor performance or may even be burned out.

SUMMARY OF THE INVENTION

The present invention is directed to solve the problem of poor heat dissipation of the conventional LED vehicle lamp.

The present invention provides a heat dissipation device of a vehicle lamp which is installed in a lamp room of the LED vehicle lamp. The heat dissipation device includes an interposing element, a heat sink, and an air supply assembly. The interposing element is disposed in the lamp room of the vehicle lamp, and divides the lamp room into a front partition and a rear partition. The interposing element has an accommodating room, at least one air feeding channel, and at least one back flow channel. A rear end of the accommodating room communicates with the rear partition, the air feeding channel communicates with the front partition and the accommodating room, and the back flow channel communicates with the front partition, the rear partition, and the accommodating room.

The heat sink is disposed in the accommodating room of the interposing element, and at least one LED assembly is disposed on the heat sink. The air supply assembly includes at least one air feeding fan and at least one back flow fan. The air feeding fan is disposed in the accommodating room, and has an inlet facing the air feeding channel and an outlet facing the heat sink, so as to draw air in the front partition to the rear partition through the air feeding channel. The back flow fan is disposed in the rear partition behind the interposing element, and has an inlet located in the rear partition and an outlet communicating with a rear end of the back flow channel, so as to draw air in the rear partition to the front partition through the back flow channel.

The present invention further provides a heat dissipation device of a vehicle lamp which is installed in a lamp room of the vehicle lamp. The heat dissipation device includes an interposing element, a first heat sink, a second heat sink, and an air supply assembly. The interposing element is used to divide the lamp room into a front partition and a rear partition, and includes a first accommodating room, a second accommodating room, a first air feeding channel, and a back flow channel.

The first accommodating room is used to accommodate a first heat sink, and has a front end being a first closed end and a rear end communicating with the rear partition. The second accommodating room is used to accommodate a second heat sink, and has a front end communicating with the front partition and a rear end communicating with the rear partition. The first air feeding channel is located under the first accommodating room, and communicates with the front partition and the first accommodating room. A rear end of the first air feeding channel is a second closed end, so as to form a turning portion. The back flow channel communicates with the front partition, the second accommodating room, and the rear partition.

The first heat sink is disposed in the first accommodating room, and the second heat sink is disposed in the second accommodating room. The air supply assembly is used to draw air in the front partition to the rear partition through the first air feeding channel and the first heat sink, and draw air in the rear partition to the front partition through the back flow channel and the second heat sink.

Through the heat dissipation device, the present invention is characterized in that the heat dissipation device is applied to the vehicle lamp. After the vehicle lamp is turned on, the heat generated when the LED assembly is turned on is dissipated through the heat sink, so that the LED assembly is cooled down. In another aspect, the air feeding fan draws the cold air in the front partition to pass through the air feeding channel and the heat sink, and the hot air then enters the rear partition on the rear end of the vehicle lamp. Further, the back flow fan draws the hot air in the rear partition to the front partition on the front end of the vehicle lamp through the back flow channel. When the vehicle travels, an external air flow blows through the lamp cover of the vehicle lamp, so that the hot air entering the front partition is cooled down by the lamp cover with a relatively low temperature. Through such a circulation of air flow, the LED assembly can maintain a suitable working temperature, and can avoid poor performance or being burned out due to high temperature.

In addition, when the heat dissipation device of the present invention is applied to the vehicle lamp, the heat dissipation device can provide the circulating air flow between the front partition and the rear partition in the vehicle lamp, so as to dissipate moisture in the vehicle lamp, thereby preventing the moisture from condensing in the lamp cover with the relatively low temperature and resulting in atomization. Under a cold climate, the heat dissipation device guides the hot air in the rear partition to the lamp cover, so as to heat the lamp cover to remove ice frost condensed on the outer surface of the lamp cover.

DETAILED DESCRIPTION OF THE INVENTION

Figure 1:
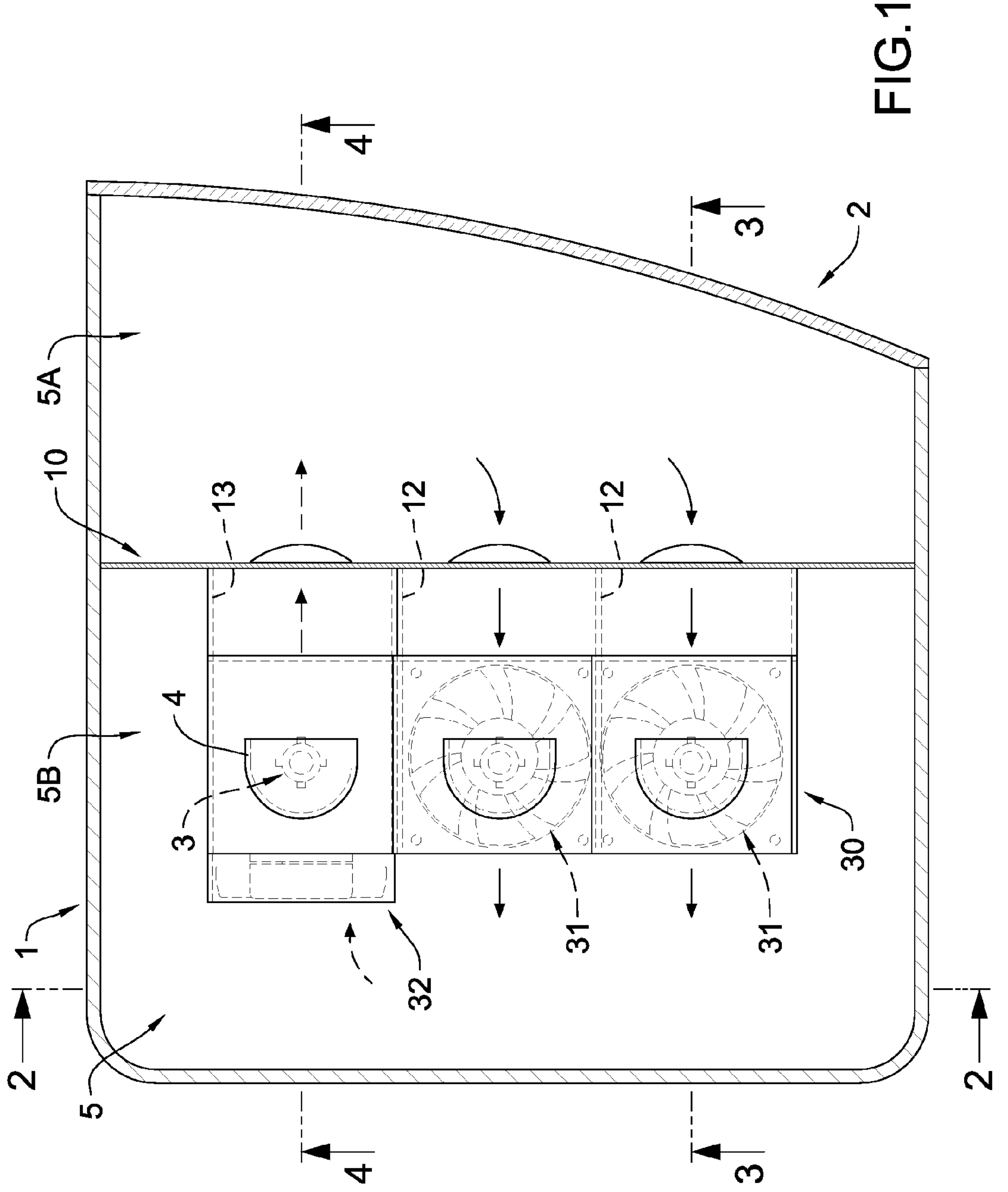
FIG. 1 is a schematic top plane view of a first embodiment of a heat dissipation device of a vehicle lamp according to the present invention applied to an LED vehicle lamp.
Figure 2:
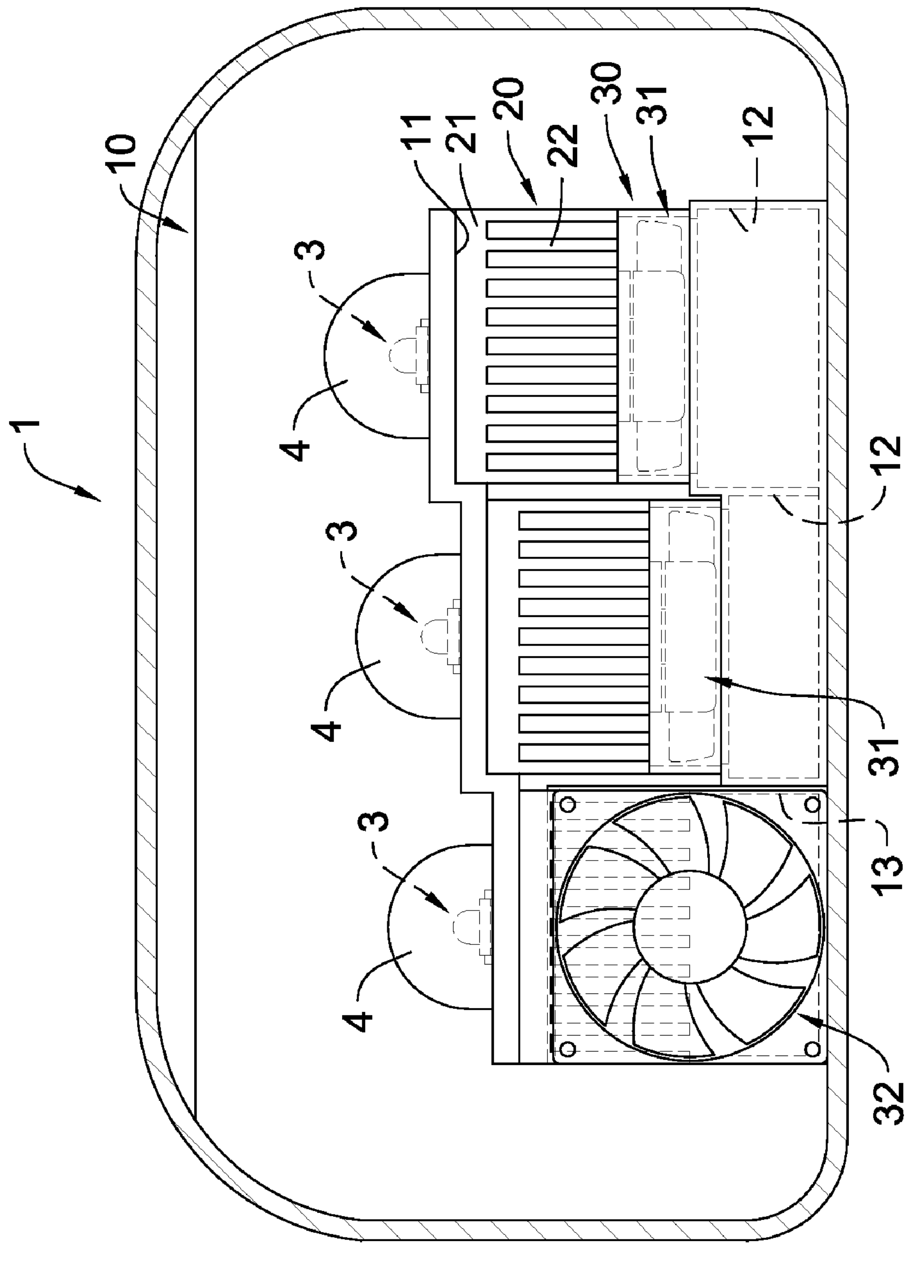
FIG. 2 is a cross-sectional view taken along line 2-2 in FIG. 1.
Figure 3:
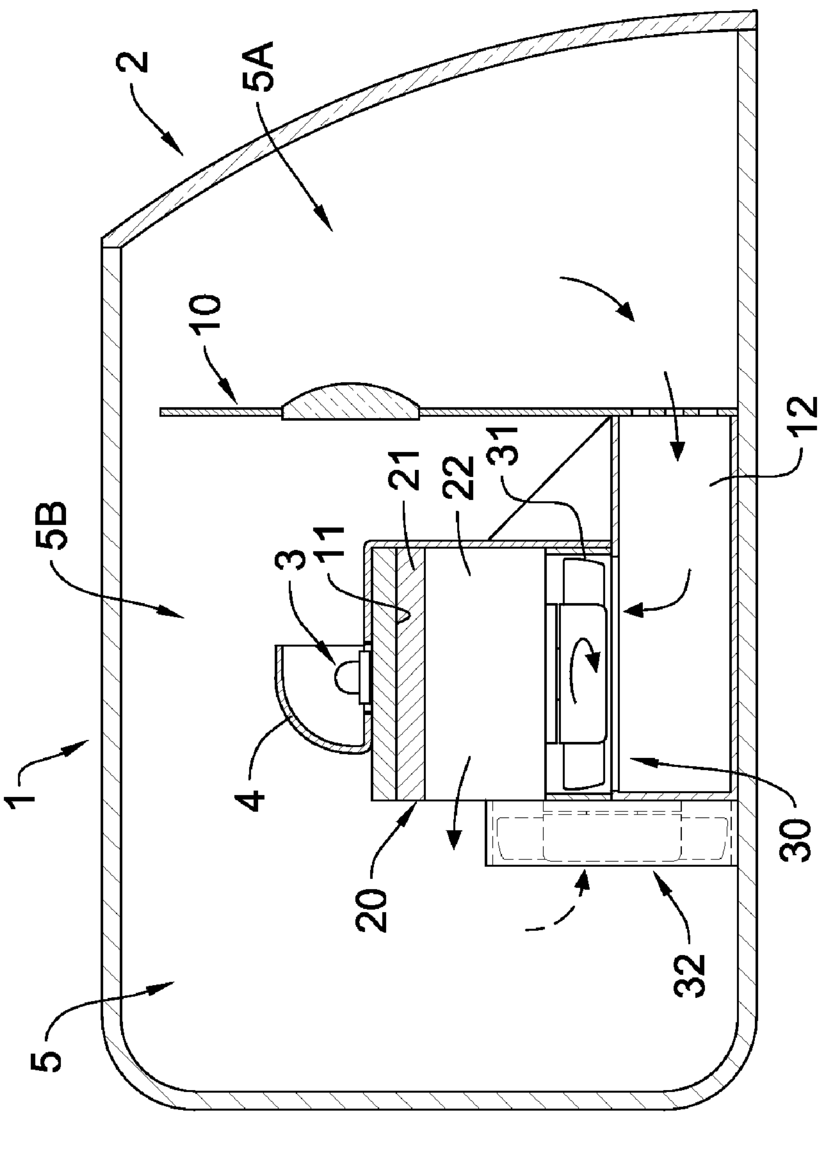
FIG. 3 is a cross-sectional view taken along line 3-3 in FIG. 1.
Figure 4:
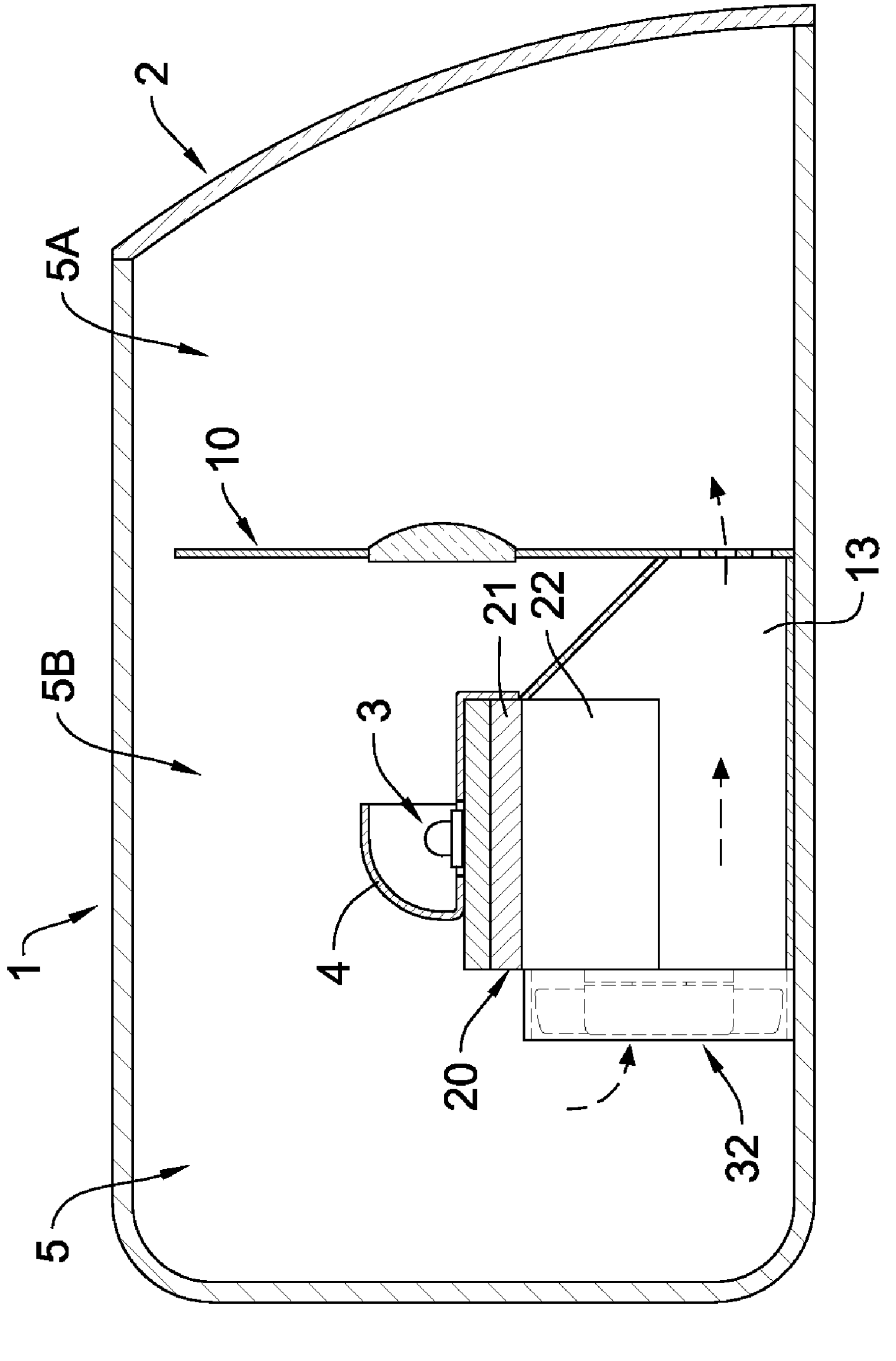
FIG. 4 is a cross-sectional view taken along line 4-4 in FIG. 1.

FIGS. 1 to 4 show operation of a first embodiment of a heat dissipation device according to the present invention when applied to an LED vehicle lamp. FIG. 2 is a cross-sectional view taken along line 2-2 in FIG. 1, FIG. 3 is a cross-sectional view taken along line 3-3 in FIG. 1, and FIG. 4 is a cross-sectional view taken along line 4-4 in FIG. 1. As shown in the figures, the vehicle lamp includes a lamp housing 1, a lamp cover 2, at least one LED assembly 3, at least one reflecting element 4, and a heat dissipation device. The lamp cover 2 is assembled on a front end of the lamp housing 1. The internal space of the lamp housing 1 and the lamp cover 2 is formed as a lamp room 5. The LED assembly 3 includes a circuit board and a plurality of high-power LEDs disposed on the circuit board. The LED assembly 3 is disposed in the lamp room 5. The reflecting element 4 is located at a light path of the LED assembly 3, and serves to reflect the light emitted by the LED assembly 3 and make it pass through the lamp cover 2 that is located in front of the LED assembly 3.

The heat dissipation device of the vehicle lamp of this embodiment comprises an interposing element 10, a heat sink 20, and an air supply assembly 30.

The interposing element 10 is disposed in the lamp room 5 of the vehicle lamp, and is combined with the reflecting element 4 to divide the lamp room 5 into a front partition 5A and a rear partition 5B. The interposing element 10 has an accommodating room 11, at least one air feeding channel 12, and at least one back flow channel 13 therein. In this embodiment, the interposing element 10 has two air feeding channels 12 and one back flow channel 13. The rear end of the accommodating room 11 is an opening end and communicates with the rear partition 5B, and the front end of the accommodating room 11 is a closed end and separated from the front partition 5A. The air feeding channel 12 is disposed under the accommodating room 11. A front end of the air feeding channel 12 communicates with the front partition 5A, and a top surface a rear end of the air feeding channel 12 communicates with the accommodating room 11. The back flow channel 13 is disposed under the accommodating room 11, and communicates with the front partition 5A, the rear partition 5B, and the accommodating room 11.

The heat sink 20 includes a base 21 and a plurality of heat sink fins 22, and the heat sink fins 22 extend outwards from a surface of the base 21. The heat sink 20 is disposed in the accommodating room 11 of the interposing element 10, and the heat sink fins 22 extend downwards to the air feeding channel 12 and the back flow channel 13. Further, the LED assembly 3 is disposed on the base 21, so that heat generated when the LED assembly 3 is turned on can be conducted to the heat sink fins 22 through the base 21.

The air supply assembly 30 includes at least one air feeding fan 31 and at least one back flow fan 32, and in this embodiment, the air supply assembly 30 has two air feeding fans 31 and one back flow fan 32. The air feeding fans 31 may be axial-flow fans, which are disposed in the accommodating room 11 and located under the heat sink fins 22 of the heat sink 20, so that inlets of the air feeding fans 31 face the air feeding channel 12, and outlets of the air feeding fans 31 face the heat sink 20, so as to draw cold air in the front partition 5A to the rear partition 5B through the air feeding channel 12 and the heat sink fins 22 of the heat sink 20. The back flow fan 32 is disposed in the rear partition 5B behind the interposing element 10, and has an inlet located in the rear partition 5B and an outlet communicating with a rear end of the back flow channel 13, so as to draw hot air in the rear partition 5B to the front partition 5A through the back flow channel 13.

In this embodiment, the back flow fan 32 may be an axial-flow fan, and is disposed on the rear end of the back flow channel 13, so that the outlet of the back flow fan 32 faces the back flow channel 13 and the heat sink fins 22 of the above heat sink 20, and the inlet of the back flow fan 32 faces the rear partition 5B behind the back flow fan 32. Preferably, the interposing element 10, the heat sink 20, and the air supply assembly 30 are fastened by using a screw.

Figure 5:
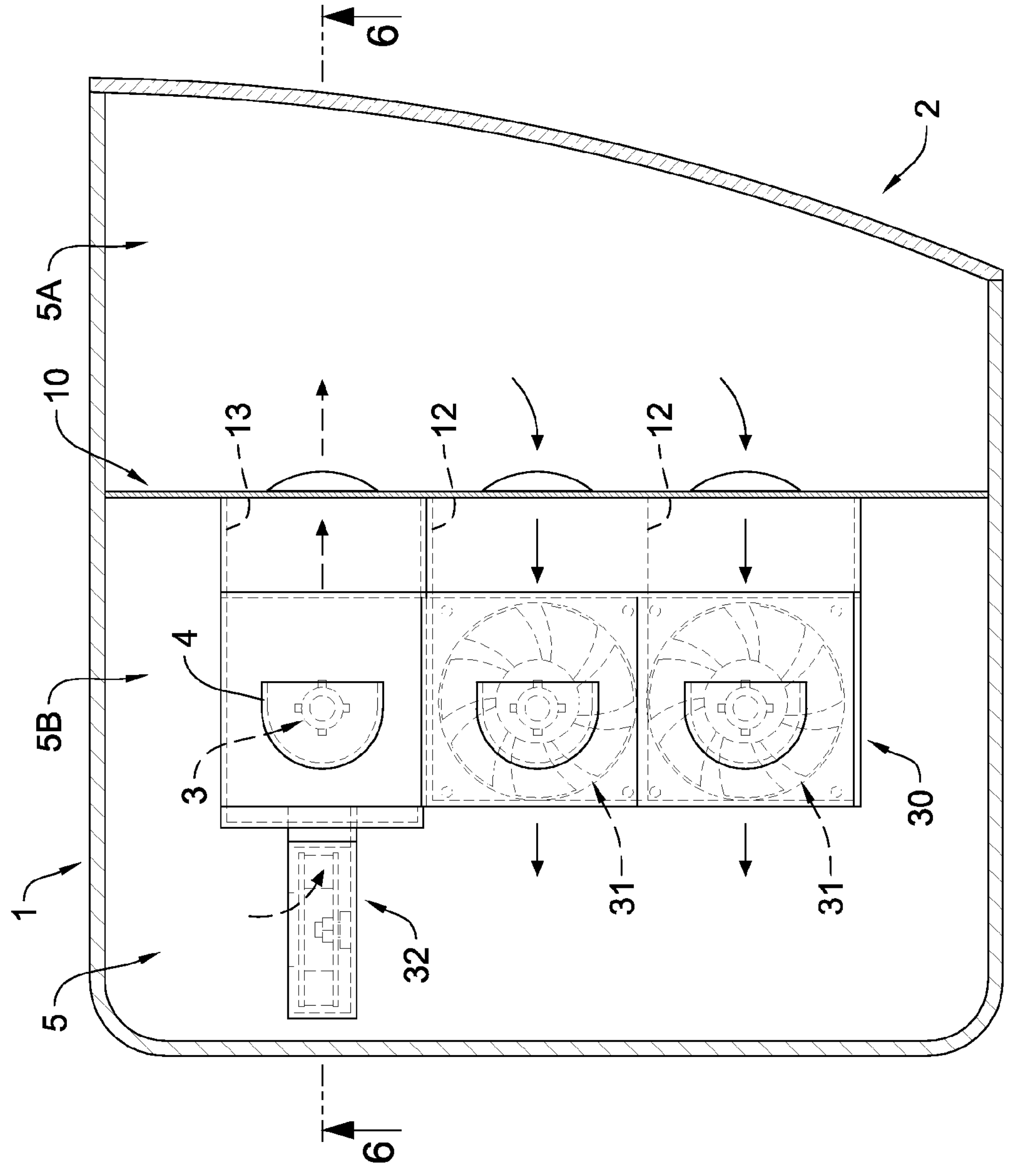
FIG. 5 is a view of operation of a second embodiment of the heat dissipation device of the vehicle lamp according to the present invention applied to the LED vehicle lamp.
Figure 6:
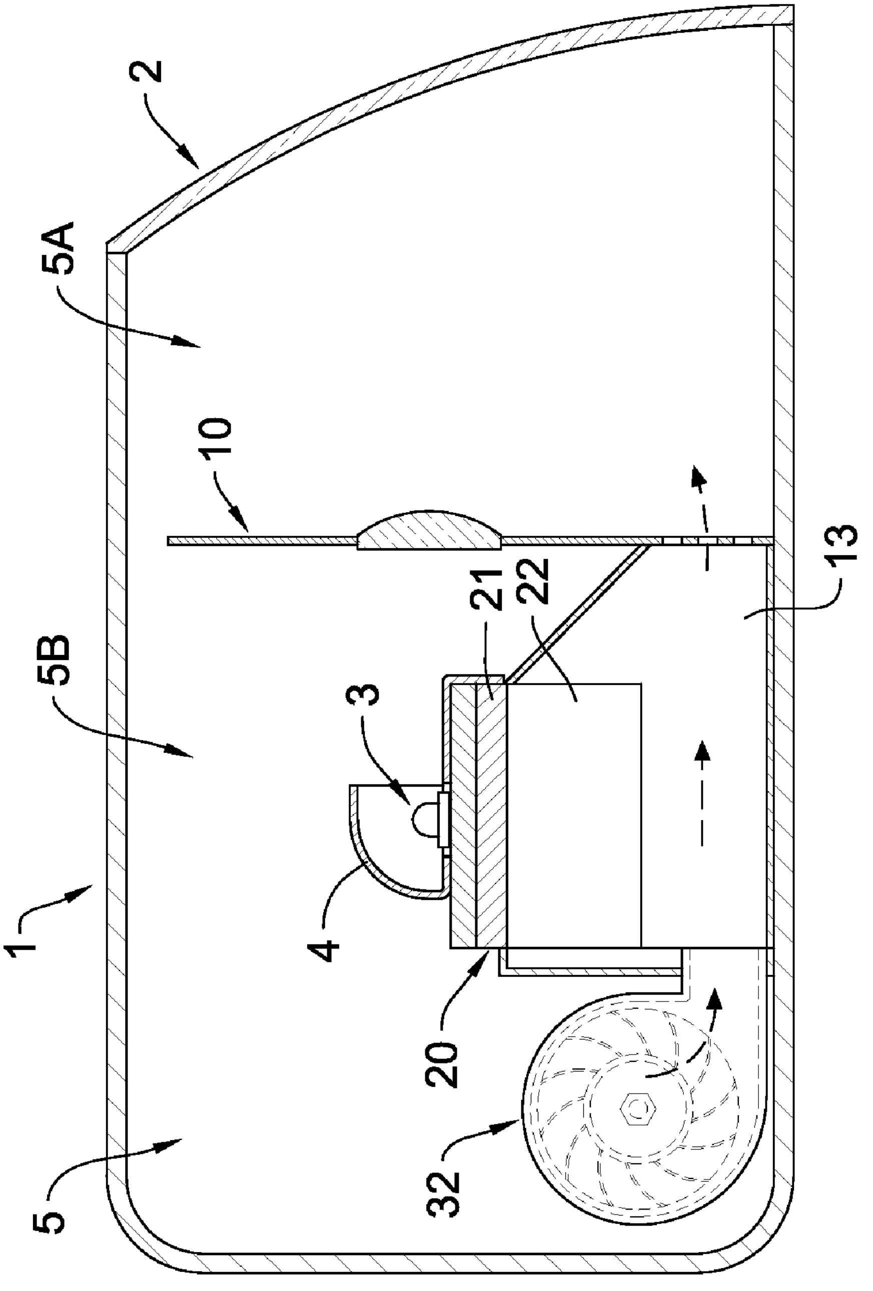
FIG. 6 is a cross-sectional view taken along line 6-6 in FIG. 5.

FIGS. 5 and 6 show operation of a second embodiment of the heat dissipation device according to the present invention when applied to the LED vehicle lamp, in which FIG. 6 is a cross-sectional view taken along line 6-6 in FIG. 5. In this embodiment, a back flow fan 32*a* may be a radial-flow blower, and is disposed on the rear partition 5B behind the back flow channel 13, so that an outlet of the back flow fan 32*a* communicates with the rear end of the back flow channel 13, and an inlet of the back flow fan 32*a* communicates with the rear partition 5B.

Figure 7:
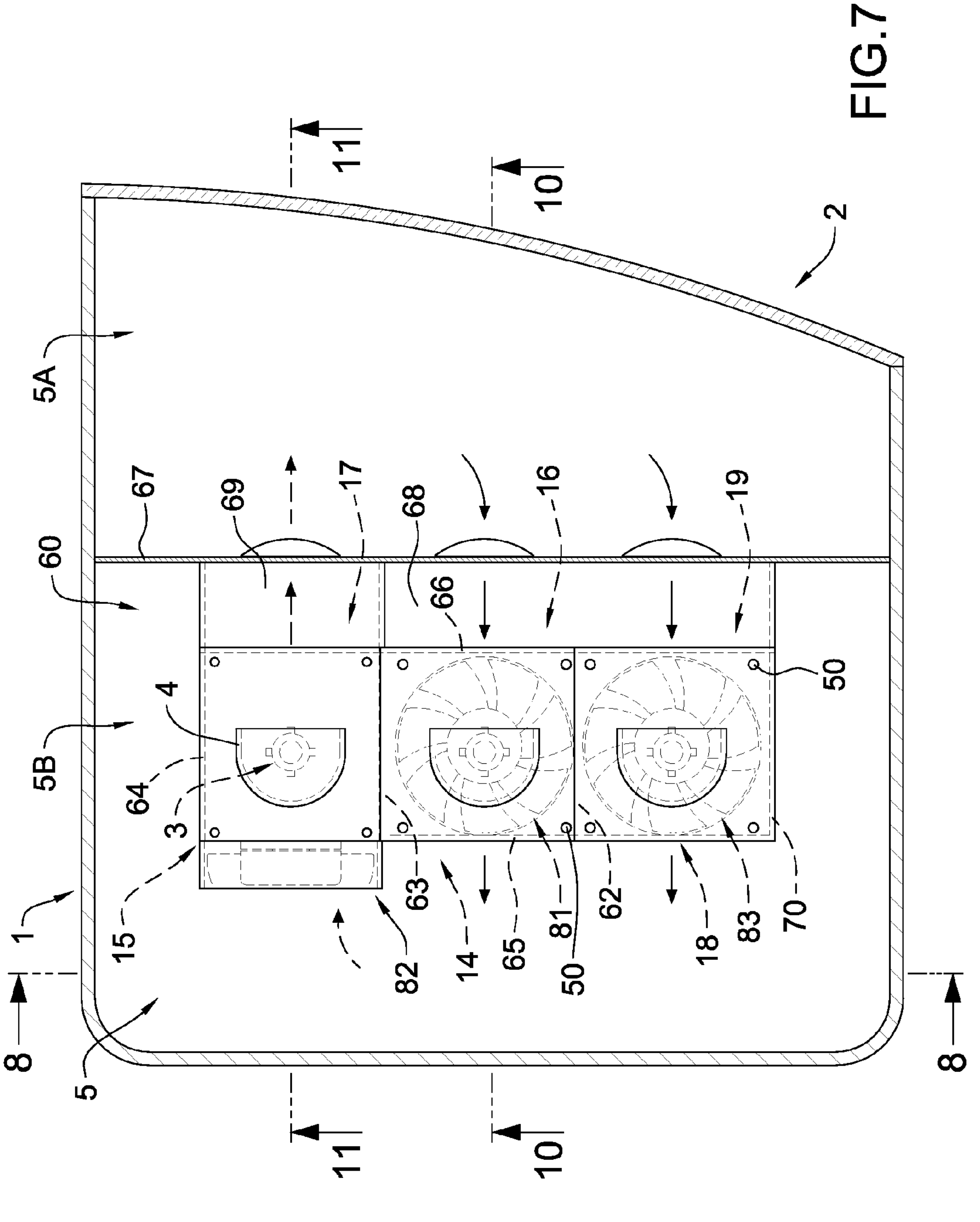
FIG. 7 is a view of operation of a third embodiment of the heat dissipation device of the vehicle lamp according to the present invention applied to the LED vehicle lamp.
Figure 8:
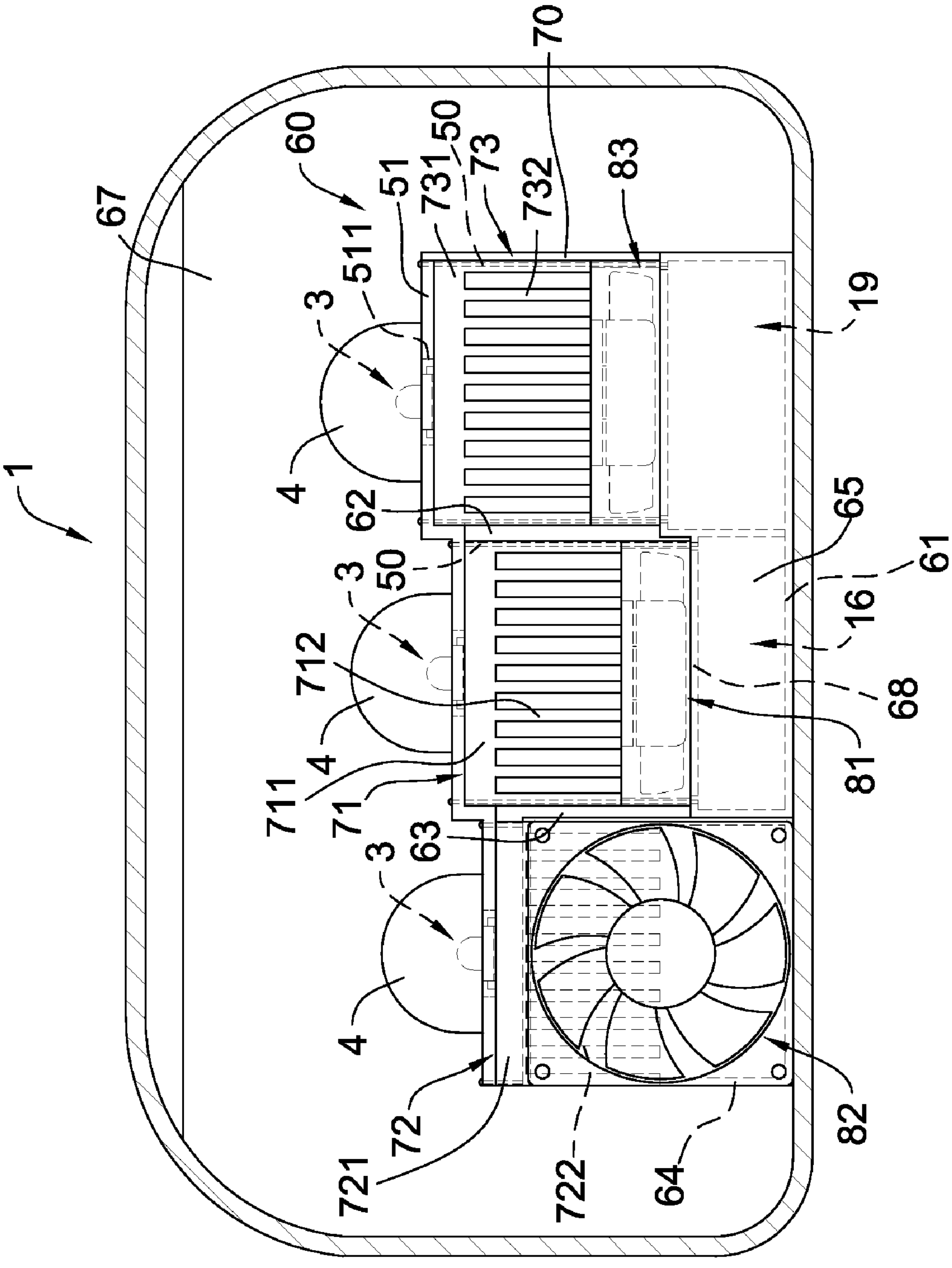
FIG. 8 is a cross-sectional view taken along line 8-8 in FIG. 7.
Figure 9:
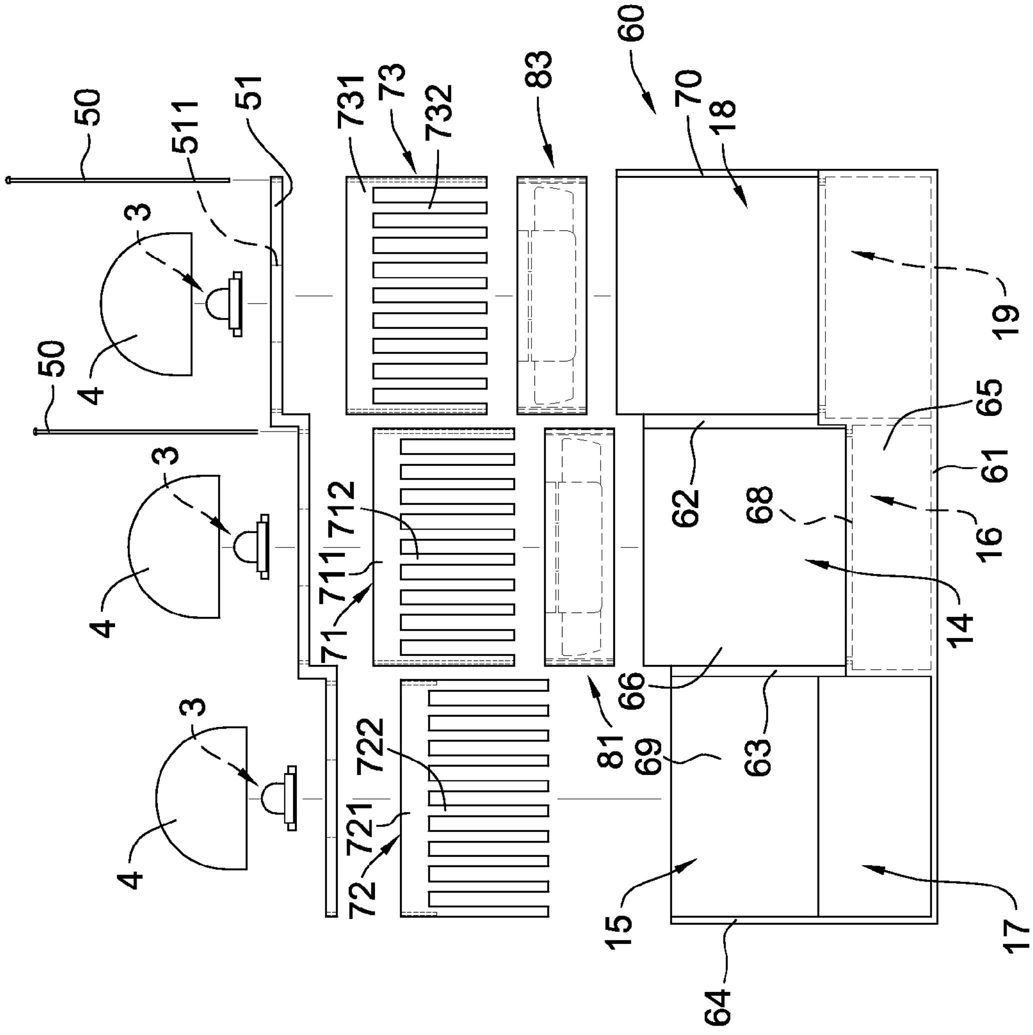
FIG. 9 is a schematic exploded view of FIG. 8.
Figure 10:
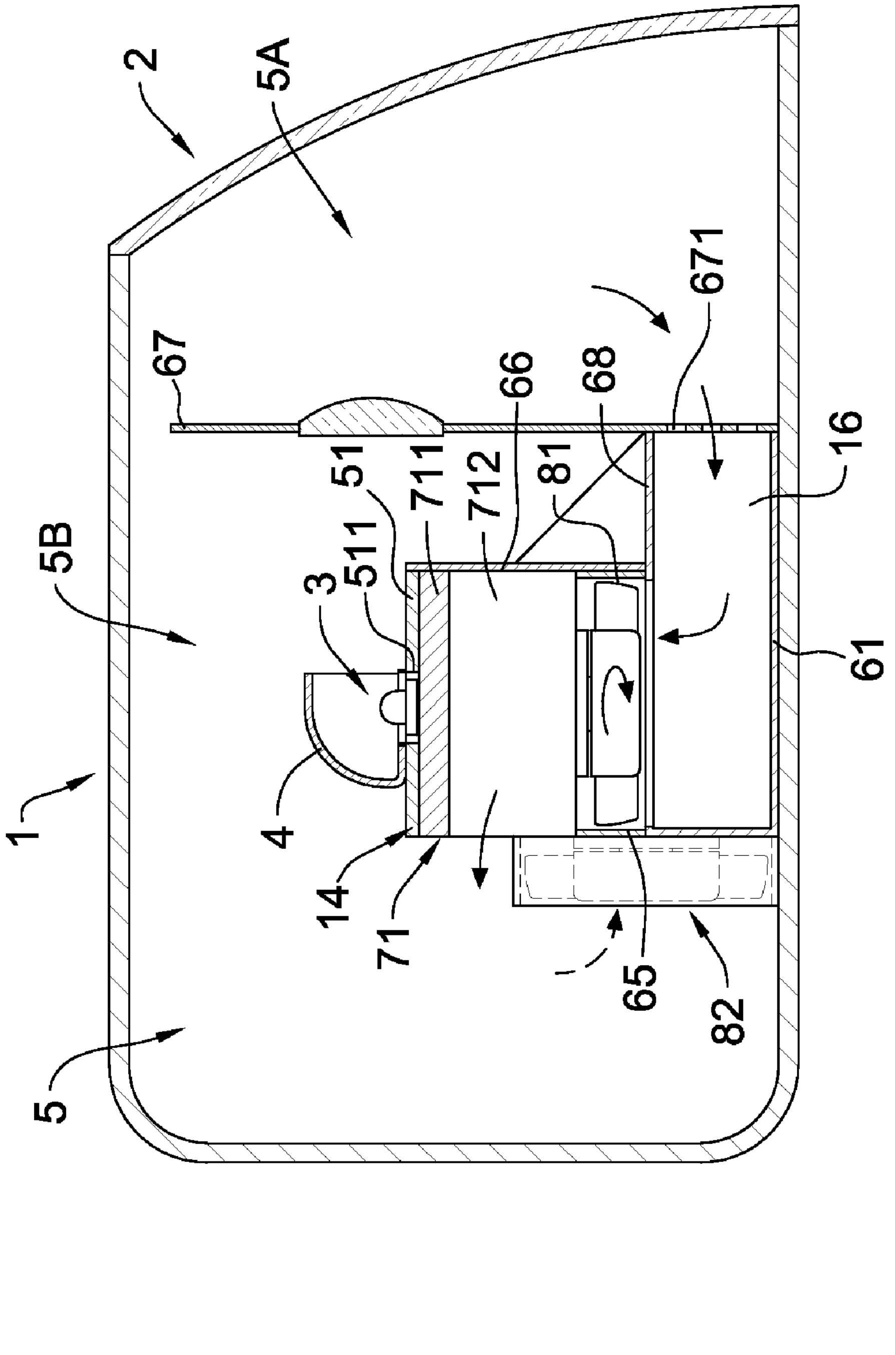
FIG. 10 is a cross-sectional view taken along line 10-10 in FIG. 7.
Figure 11:
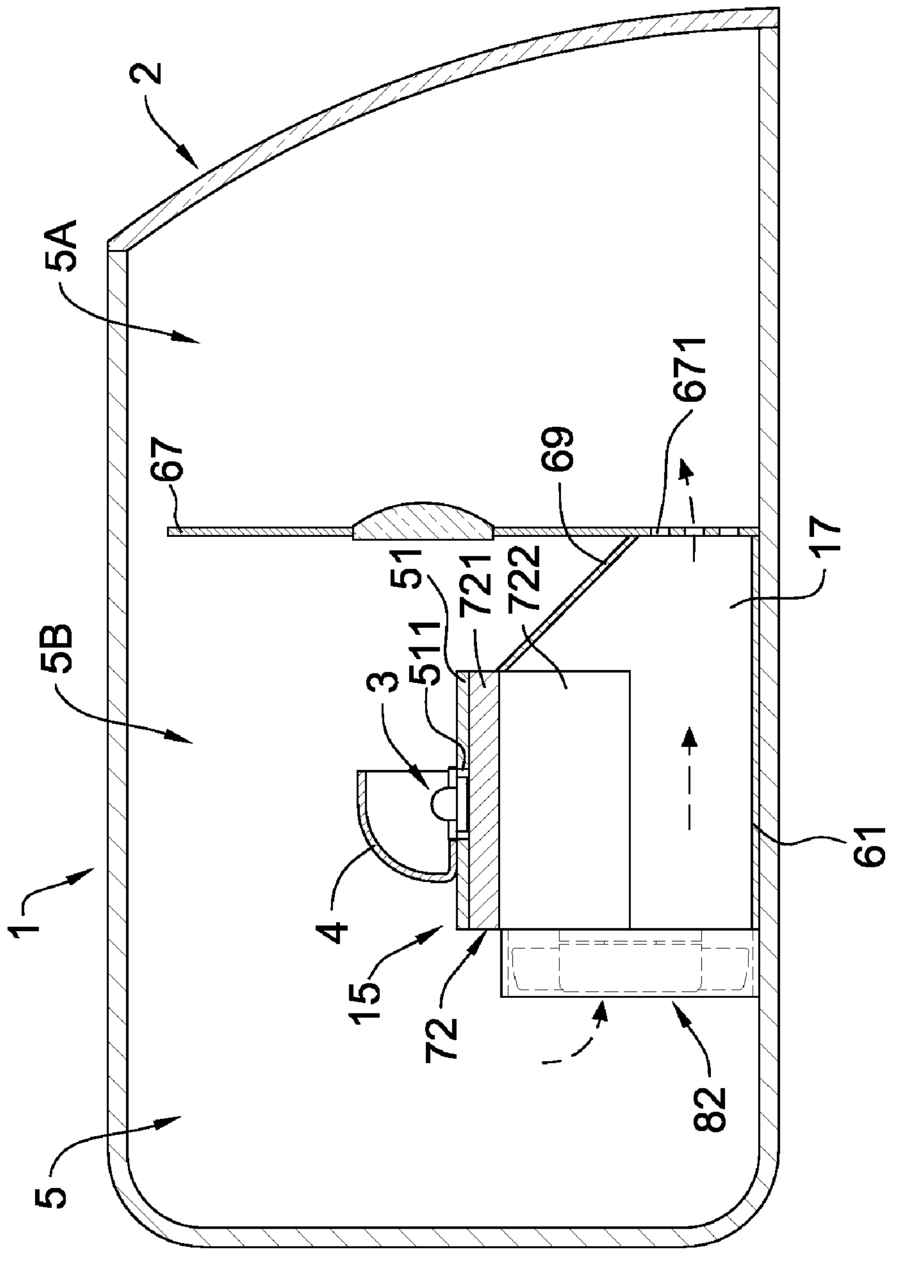
FIG. 11 is a cross-sectional view taken along a line 11-11 in FIG. 7.

FIGS. 7 to 11 show operation of a third embodiment of the heat dissipation device according to the present invention when applied to the LED vehicle lamp. FIG. 8 is a cross-sectional view taken along line 8-8 in FIG. 7, FIG. 9 is a schematic exploded view of FIG. 8, FIG. 10 is a cross-sectional view taken along line 10-10 in FIG. 7, and FIG. 11 is a cross-sectional view taken along line 11-11 in FIG. 7.

The heat dissipation device of the vehicle lamp in this embodiment is installed in the lamp room 5 of the vehicle lamp, and the heat dissipation device includes an interposing element 60, a first heat sink 71, a second heat sink 72, and a air supply assembly a first air feeding fan 81 and a back flow fan 82.

The interposing element 60 is used to divide the lamp room 5 into a front partition 5A and a rear partition 5B. The interposing element 60 includes a first accommodating room 14, a second accommodating room 15, a first air feeding channel 16, and a back flow channel 17. The first accommodating room 14 is used to accommodate the first heat sink 71. A front end of the first accommodating room 14 is a first closed end, and a rear end thereof communicates with the rear partition 5B. The second accommodating room 15 is used to accommodate the second heat sink 72, a front end of the second accommodating room 15 communicates with the front partition 5A, and a rear end thereof communicates with the rear partition 5B. The first air feeding channel 16 is located under the first accommodating room 14, and the first air feeding channel 16 communicates with the front partition 5A and the first accommodating room 14. A rear end of the first air feeding channel 16 is a second closed end, so as to form a turning portion, that is, the air entering the first air feeding channel 16 is turned upwards here and then enters the first accommodating room 14. The back flow channel 17 communicates with the front partition 5A, the second accommodating room 15, and the rear partition 5B.

The first heat sink 71 is disposed in the first accommodating room 14, and has a first base 711 and a plurality of first heat sink fins 712 formed on a surface of the first base 711. The second heat sink 72 is disposed in the second accommodating room 15, and has a second base 721 and a plurality of second heat sink fins 722 formed on a surface of the second base 721. The first base 711 and the second base 721 are horizontally disposed. The first heat sink fins 712 and the second heat sink fins 722 extend downwards.

The air supply assembly is used to draw the air in the front partition 5A to the rear partition 5B through the first air feeding channel 16 and the first heat sink 71, and draw the air in the rear partition 5B to the front partition 5A through the back flow channel 17 and the second heat sink 72. In this embodiment, the air supply assembly includes a first air feeding fan 81 and a back flow fan 82. The first air feeding fan 81 is located in the first accommodating room 14, and has an inlet facing the first air feeding channel 16 and an outlet facing the first heat sink 71, so as to draw the air in the front partition 5A to the rear partition 5B through the first air feeding channel 16 and the first heat sink 71.

The back flow fan 82 is disposed in the rear partition 5B behind the interposing element 60, and has an inlet located in the rear partition 5B and an outlet communicating with the rear end of the back flow channel 17, so as to draw the air in the rear partition 5B to the front partition 5A through the back flow channel 17 and the second heat sink 72. The back flow fan 82 may be an axial-flow fan or a radial-flow blower.

Preferably, the heat dissipation device further includes a fixing body 51 located above the first heat sink 71 and the second heat sink 72. The fixing body 51 has at least one through hole 511, and the at least one LED assembly 3 is disposed in the through hole 511 and directly contacts the first base 711 of the first heat sink 71 and the second base 721 of the second heat sink 72. The fixing body 51, the interposing element 60, the first heat sink 71, and the air supply assembly (the first air feeding fan 81) are fastened by using a screw 50.

In this embodiment, the interposing element 60 further includes a bottom wall 61, a plurality of side walls, a rear wall 65, and a front wall 66. The side walls are vertically located on the bottom wall 61, and the side walls include a first side wall 62, a second side wall 63, and a third side wall 64. The second side wall 63, the third side wall 64, and the bottom wall 61 define the second accommodating room 15 and the back flow channel 17.

The rear wall 65 is vertically located on the bottom wall 61, and is connected to the first side wall 62 and the second side wall 63. The first accommodating room 14 is located above the rear wall 65.

The front wall 66 is connected to the first side wall 62 and the second side wall 63; the front wall 66 is located on the front end of the first accommodating room 14 to form the first closed end, so as to separate the first accommodating room 14 and the front partition 5A. The front wall 66 is spaced from the bottom wall 61 at a distance, that is, the front wall 66 does not contact the bottom wall 61. The first air feeding channel 16 is located under the front wall 66. The rear wall 65 is located on the rear end of the first air feeding channel 16 to form the second closed end, so as to separate the first air feeding channel 16 and the rear partition 5B.

In this embodiment, the interposing element 60 further includes an interposing wall 67, a first surrounding wall 68, and a second surrounding wall 69. The interposing wall 60 is substantially vertical to the bottom wall 61, and is located in front of the first air feeding channel 16. The interposing wall 67 has a plurality of through holes 671 disposed at the positions corresponding to the first air feeding channel 16.

The first surrounding wall 68 is located between the interposing wall 67 and the front wall 66, so as to define a part of the first air feeding channel 16. The second surrounding wall 69 is located between the interposing wall 67 and the second accommodating room 15, so as to define a part of the back flow channel 17.

In this embodiment, the interposing element 60 further includes a third accommodating room 18, a second air feeding channel 19, a second air feeding fan 83, and a fourth side wall 70. The third accommodating room 18 is used to accommodate a third heat sink 73, a front end of the third accommodating room 18 is a third closed end, and a rear end thereof communicates with the rear partition 5B. The second air feeding channel 19 is located under the third accommodating room 18, and the second air feeding channel 19 communicates with the front partition 5A and the third accommodating room 18. A rear end of the second air feeding channel 19 is a fourth closed end to form a turning portion, that is, the air entering the second air feeding channel 19 is turned upwards here and then enters the third accommodating room 18.

The second air feeding fan 83 is located in the third accommodating room 18, and has an inlet facing the second air feeding channel 19 and an outlet facing the third heat sink 73, so as to draw the air located in the front partition 5A to the rear partition 5B through the second air feeding channel 19 and the third heat sink 73.

The fourth side wall 70 is vertically located on the bottom wall 61, and the rear wall 65 extends to the fourth side wall 70. The third accommodating room 18 is located above the rear wall 65, the front wall 66 extends to the fourth side wall 70, and the front wall 66 is located on the front end of the third accommodating room 18 to form the third closed end, so as to separate the third accommodating room 18 and the front partition 5A. The front wall 66 is spaced from the bottom wall 61 at a distance. The second air feeding channel 19 is located under the front wall 66. The rear wall 65 is located on the rear end of the second air feeding channel 19 to form the fourth closed end, so as to separate the second air feeding channel 19 and the rear partition 5B.

When the heat dissipation device of the vehicle lamp of the present invention is assembled, take the first embodiment as shown in FIGS. 1 to 4 for example, the heat dissipation device is disposed in the vehicle lamp, and the air supply assembly 30 is electrically connected to a power supply of the vehicle lamp. In the vehicle lamp, a front side of the interposing element 10 forms a reflecting surface which provides desired optical performances for the LED assembly 3, so as to project a predetermined light pattern.

When the vehicle travels at night or in darkness without sufficient light, when the vehicle lamp is turned on, the heat dissipation device is also activated. The heat generated when the LED assembly 3 in the vehicle lamp is turned on is conducted to the heat sink fins 22 through the heat sink 20, thereby enlarging the heat dissipation surface area, so as to cool down the LED assembly 3. In addition, the air feeding fan 31 in the air supply assembly 30 draws the cold air in the front partition 5A on the front end of the vehicle lamp through the air feeding channel 12 and the heat sink fins 22, so that the hot air enters the rear partition 5B on the rear end of the vehicle lamp. The rear partition 5B is separated from an engine room behind the rear partition 5B by the lamp housing 1. Further, the back flow fan 32 draws the hot air in the rear partition 5B to the front partition 5A on the front end of the vehicle lamp through the back flow channel 13. When the vehicle travels, an external air flow blows through the lamp cover 2 of the vehicle lamp, so that the hot air entering the front partition 5A is cooled down by the lamp cover 2 with the relatively low temperature. Through such a circulation of air flow, the LED assembly 3 can maintain a suitable working temperature, and can avoid poor performance or being burned out due to high temperature.

When the heat dissipation device of the present invention is applied to the vehicle lamp, in addition to the above-mentioned heat dissipation function, the heat dissipation device can provide the circulating air flow between the front partition 5A and the rear partition 5B partitioned in the vehicle lamp. Therefore, if residual moisture exists in the vehicle lamp, the circulating air flow can prevent the moisture from condensing in the lamp cover 2 with the relatively low temperature and resulting in atomization. When the vehicle travels in cold climate, the heat dissipation device guides the hot air in the rear partition 5B of the vehicle lamp to the lamp cover 2 in front of the heat dissipation device, so as to heat the lamp cover 2 to remove ice frost condensed on an outer surface of the lamp cover 2.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A heat dissipation device of a vehicle lamp, installed in a lamp room of the vehicle lamp, comprising:

an interposing element, disposed in the lamp room of the vehicle lamp, for dividing the lamp room into a front partition and a rear partition, wherein the interposing element has an accommodating room, at least one air feeding channel and at least one back flow channel, a rear end of the accommodating room communicates with the rear partition, the air feeding channel communicates with the front partition and the accommodating room, and the back flow channel communicates with the front partition, the rear partition, and the accommodating room;

a heat sink, disposed in the accommodating room of the interposing element, wherein at least one light emitting diode LED assembly is disposed on the heat sink; and an air supply assembly, comprising at least one air feeding fan and at least one back flow fan, wherein the air feeding fan is located in the accommodating room and has an inlet facing the air feeding channel and an outlet facing the heat sink, so as to draw air in the front partition to the rear partition through the air feeding channel, and the back flow fan is disposed in the rear partition behind the interposing element and has an inlet located in the rear partition and an outlet communicating with a rear end of the back flow channel, so as to draw air in the rear partition to the front partition through the back flow channel.

2. The heat dissipation device of a vehicle lamp according to claim 1, wherein the back flow fan is an axial-flow fan disposed on the rear end of the back flow channel, and has an outlet facing the back flow channel and the heat sink disposed above the back flow fan, and an inlet facing the rear partition.

3. The heat dissipation device of a vehicle lamp according to claim 1, wherein the back flow fan is a radial-flow blower, and has an outlet that communicates with the rear end of the back flow channel, and an inlet that communicates with the rear partition.

4. The heat dissipation device of a vehicle lamp according to claim 1, wherein the interposing element has two air feeding channels and one back flow channel, rear end top surfaces of the air feeding channels communicate with the accommodating room, the air supply assembly has two air feeding fans and one back flow fan, and the air feeding fans are axial-flow fans disposed in the accommodating room and located under the heat sink.

5. The heat dissipation device of a vehicle lamp according to claim 2, wherein the interposing element has two air feeding channels and one back flow channel, rear end top surfaces of the air feeding channels communicate with the accommodating room, the air supply assembly has two air feeding fans and one back flow fan, and the air feeding fans are axial-flow fans disposed in the accommodating room and located under the heat sink.

6. The heat dissipation device of a vehicle lamp according to claim 3, wherein the interposing element has two air feeding channels and one back flow channel, rear end top surfaces of the air feeding channels communicate with the accommodating room, the air supply assembly has two air feeding fans and one back flow fan, and the air feeding fans are axial-flow fans disposed in the accommodating room and located under the heat sink.

7. The heat dissipation device of a vehicle lamp according to claim 1, wherein the interposing element, the heat sink, and the air supply assembly are fastened by using a screw.

8. The heat dissipation device of a vehicle lamp according to claim 1, wherein the heat sink comprises a base and a plurality of heat sink fins formed on a surface of the base, and the heat sink fins extend downwards.

9. A heat dissipation device of a vehicle lamp, installed in a lamp room of the vehicle lamp, comprising:

an interposing element, disposed in the lamp room of the vehicle lamp, for dividing the lamp room into a front partition and a rear partition, wherein the interposing element has an accommodating room, at least one air feeding channel, and at least one back flow channel;

a heat sink, comprising a base and a plurality of heat sink fins formed on a surface of the base, and disposed in the accommodating room of the interposing element, wherein at least one light emitting diode LED assembly is disposed on the heat sink, the base is horizontally disposed, and the heat sink fins extend downwards; and a air supply assembly, attached to the interposing elements, for drawing air in the front partition to the rear partition through the air feeding channel and the heat sink, and drawing air in the rear partition to the front partition through the back flow channel and the heat sink.

10. The heat dissipation device of a vehicle lamp according to claim 9, wherein a rear end of the accommodating room communicates with the rear partition, the air feeding channel communicates with the front partition and the accommodating room, and the back flow channel communicates with the front partition, the rear partition, and the accommodating room.

11. The heat dissipation device of a vehicle lamp according to claim 9, wherein the air supply assembly comprises at least one air feeding fan and at least one back flow fan, the air feeding fan is located in the accommodating room, and has an inlet facing the air feeding channel and an outlet facing the heat sink, so as to draw the air in the front partition to the rear partition through the air feeding channel, and the back flow fan is disposed in the rear partition behind the interposing element, and has an inlet located in the rear partition and an outlet communicating with a rear end of the back flow channel, so as to draw the air in the rear partition to the front partition through the back flow channel.

12. The heat dissipation device of a vehicle lamp according to claim 11, wherein the back flow fan is an axial-flow fan disposed on the rear end of the back flow channel, and the back flow fan has an outlet facing the back flow channel and the heat sink above the back flow fan, and an inlet facing the rear partition.

13. The heat dissipation device of a vehicle lamp according to claim 11, wherein the back flow fan is a radial-flow blower, and has an outlet communicating with the rear end of the back flow channel, and an inlet communicating with the rear partition.

14. The heat dissipation device of a vehicle lamp according to claim 9, wherein the interposing element has two air feeding channels and one back flow channel, rear end top surfaces of the air feeding channels communicate with the accommodating room, the air supply assembly has two air feeding fans and one back flow fan, and the air feeding fans are axial-flow fans disposed in the accommodating room and located under the heat sink.

15. The heat dissipation device of a vehicle lamp according to claim 9, further comprising a fixing body, located above the heat sink, and having at least one through hole, wherein the at least one LED assembly is located in the through hole and directly contacts the base of the heat sink, and the fixing body, the interposing element, the heat sink, and the air supply assembly are fastened by using a screw.

16. An interposing element of a vehicle lamp, installed in a lamp room of the vehicle lamp for dividing the lamp room into a front partition and a rear partition and providing air flow channel, comprising:

- a first accommodating room, for accommodating a first heat sink, wherein a front end of the first accommodating room is a first closed end, and a rear end thereof communicates with the rear partition;
- a second accommodating room, for accommodating a second heat sink, wherein a front end of the second accommodating room communicates with the front partition, and a rear end thereof communicates with the rear partition;
- a first air feeding channel, located under the first accommodating room, and communicating with the front partition and the first accommodating room, wherein a rear end of the first air feeding channel is a second closed end, so as to form a turning portion; and
- a back flow channel, communicating with the front partition, the second accommodating room, and the rear partition.

17. The interposing element according to claim 16, further comprising:

- a bottom wall;
- a plurality of side walls, located on the bottom wall, and comprising a first side wall, a second side wall, and a third side wall, wherein the second side wall, the third side wall, and the bottom wall define the second accommodating room and the back flow channel;
- a rear wall, located on the bottom wall, and connected to the first side wall and the second side wall, wherein the first accommodating room is located above the rear wall; and
- a front wall, connected to the first side wall and the second side wall, wherein the front wall is located on the front end of the first accommodating room to form the first closed end, so as to separate the first accommodating room and the front partition, the front wall is spaced from the bottom wall at a distance, the first air feeding channel is located under the front wall, and the rear wall is located on the rear end of the first air feeding channel to form the second closed end, so as to separate the first air feeding channel and the rear partition.

18. The interposing element according to claim 16, further comprising an interposing wall, substantially vertical to the bottom wall, and located in front of the first air feeding channel.

19. The interposing element according to claim 18, wherein the interposing wall has a plurality of through holes disposed at the positions corresponding to the first air feeding channel.

20. The interposing element according to claim 18, further comprising a first surrounding wall and a second surrounding wall, wherein the first surrounding wall is located between the interposing wall and the front wall, so as to define a part of the first air feeding channel, and the second surrounding wall is located between the interposing wall and the second accommodating room, so as to define a part of the back flow channel.

21. The interposing element according to claim 16, further comprising:

- a third accommodating room, for accommodating a third heat sink, wherein a front end of the third accommodating room is a third closed end, and a rear end thereof communicates with the rear partition; and
- a second air feeding channel, located under the third accommodating room, and communicating with the front partition and the third accommodating room, wherein a rear end of the second air feeding channel is a fourth closed end to form a turning portion.

22. The interposing element according to claim 17, further comprising:

- a third accommodating room, for accommodating a third heat sink, wherein a front end of the third accommodating room is a third closed end, and a rear end thereof communicates with the rear partition;
- a second air feeding channel, located under the third accommodating room, and communicating with the front partition and the third accommodating room, wherein a rear end of the second air feeding channel is a fourth closed end to form a turning portion; and
- a fourth side wall, located on the bottom wall, wherein the rear wall extends to the fourth side wall, the third accommodating room is located above the rear wall, the front wall extends to the fourth side wall, the front wall is located on the front end of the third accommodating room to form the third closed end, so as to separate the third accommodating room and the front partition, the front wall is spaced from the bottom wall at a distance, the second air feeding channel is located under the front wall, and the rear wall is located on the rear end of the second air feeding channel to form the fourth closed end, so as to separate the second air feeding channel and the rear partition.

23. A heat dissipation device of a vehicle lamp, installed in a lamp room of the vehicle lamp, comprising:

- an interposing element, for dividing the lamp room into a front partition and a rear partition, and comprising:
- a first accommodating room, for accommodating a first heat sink, wherein a front end of the first accommodating room is a first closed end, and a rear end thereof communicates with the rear partition;
- a second accommodating room, for accommodating a second heat sink, wherein a front end of the second accommodating room communicates with the front partition, and a rear end thereof communicates with the rear partition;

a first air feeding channel, located under the first accommodating room, and communicating with the front partition and the first accommodating room, wherein a rear end of the first air feeding channel is a second closed end, so as to form a turning portion; and a back flow channel, communicating with the front partition, the second accommodating room, and the rear partition;

a first heat sink, disposed in the first accommodating room;

a second heat sink, disposed in the second accommodating room; and an air supply assembly, for drawing air in the front partition to the rear partition through the first air feeding channel and the first heat sink, and drawing air in the rear partition to the front partition through the back flow channel and the second heat sink.

24. The heat dissipation device of a vehicle lamp according to claim 23, wherein the first heat sink comprises a first base and a plurality of first heat sink fins formed on a surface of the first base, the second heat sink comprises a second base and a plurality of second heat sink fins formed on a surface of the second base, and the first heat sink fins and the second heat sink fins extend downwards.

25. The heat dissipation device of a vehicle lamp according to claim 23, wherein the air supply assembly comprises a first air feeding fan and a back flow fan, the first air feeding fan is located in the first accommodating room, and has an inlet facing the first air feeding channel and an outlet facing the first heat sink, so as to draw the air in the front partition to the rear partition through the first air feeding channel and the first heat sink, and the back flow fan is disposed in the rear partition behind the interposing element, and has an inlet located in the rear partition and an outlet communicating with a rear end of the back flow channel, so as to draw the air in the rear partition to the front partition through the back flow channel and the second heat sink.

26. The heat dissipation device of a vehicle lamp according to claim 25, wherein the back flow fan is an axial-flow fan disposed on the rear end of the back flow channel, and has an outlet facing the back flow channel and the second heat sink, and an inlet facing the rear partition.

27. The heat dissipation device of a vehicle lamp according to claim 25, wherein the back flow fan is a radial-flow blower, and has an outlet communicating with the rear end of the back flow channel, and an inlet communicating with the rear partition.

28. The heat dissipation device of a vehicle lamp according to claim 23, further comprising a fixing body, located above the first heat sink and the second heat sink, and having at least one through hole, wherein at least one light emitting diode LED assembly is located in the through hole and directly contacts the first heat sink and the second heat sink, and the fixing body, the interposing element, the first heat sink, and the air supply assembly are fastened by using a screw.

29. The heat dissipation device of a vehicle lamp according to claim 23, wherein the interposing element further comprises:

a bottom wall;

a plurality of side walls, located on the bottom wall, and comprising a first side wall, a second side wall, and a third side wall, wherein the second side wall, the third side wall, and the bottom wall define the second accommodating room and the back flow channel;

a rear wall, located on the bottom wall, and connected to the first side wall and the second side wall, wherein the first accommodating room is located above the rear wall; and a front wall, connected to the first side wall and the second side wall, wherein the front wall is located on the front end of the first accommodating room to form the first closed end, so as to separate the first accommodating room and the front partition, the front wall is spaced from the bottom wall at a distance, the first air feeding channel is located under the front wall, and the rear wall is located on the rear end of the first air feeding channel to form the second closed end, so as to separate the first air feeding channel and the rear partition.

30. The heat dissipation device of a vehicle lamp according to claim 29, further comprising an interposing wall, substantially vertical to the bottom wall, and located in front of the first air feeding channel.

31. The heat dissipation device of a vehicle lamp according to claim 30, wherein the interposing wall has a plurality of through holes disposed at the positions corresponding to the first air feeding channel.

32. The heat dissipation device of a vehicle lamp according to claim 29, further comprising a first surrounding wall and a second surrounding wall, wherein the first surrounding wall is located between the interposing wall and the front wall, so as to define a part of the first air feeding channel, and the second surrounding wall is located between the interposing wall and the second accommodating room, so as to define a part of the back flow channel.

33. The heat dissipation device of a vehicle lamp according to claim 23, wherein the interposing element further comprises:

a third accommodating room, for accommodating a third heat sink, wherein a front end of the third accommodating room is a third closed end, and a rear end thereof communicates with the rear partition; and a second air feeding channel, located under the third accommodating room, and communicating with the front partition and the third accommodating room, wherein a rear end of the second air feeding channel is a fourth closed end to form a turning portion.

34. The heat dissipation device of a vehicle lamp according to claim 29, wherein the interposing element further comprises:

a third accommodating room, for accommodating a third heat sink, wherein a front end of the third accommodating room is a third closed end, and a rear end thereof communicates with the rear partition;

a second air feeding channel, located under the third accommodating room, and communicating with the front partition and the third accommodating room, wherein a rear end of the second air feeding channel is a fourth closed end to form a turning portion; and a fourth side wall, located on the bottom wall, wherein the rear wall extends to the fourth side wall, the third accommodating room is located above the rear wall, the front wall extends to the fourth side wall, the front wall is located on the front end of the third accommodating room to form the third closed end, so as to separate the third accommodating room and the front partition, the front wall is spaced from the bottom wall at a distance, the second air feeding channel is located under the front wall, and the rear wall is located on the rear end of the second air feeding channel to form the fourth closed end, so as to separate the second air feeding channel and the rear partition.

* * * * *